(12) United States Patent  
Baldwin et al.

(10) Patent No.: US 9,236,719 B1  
(45) Date of Patent: Jan. 12, 2016

(54) CABLE RAIL SYSTEM

(71) Applicants: Jeffrey Baldwin, Desert Hills, AZ (US); John Klein, Gilbert, AZ (US); Ryan Liebengood, Gilbert, AZ (US)

(72) Inventors: Jeffrey Baldwin, Desert Hills, AZ (US); John Klein, Gilbert, AZ (US); Ryan Liebengood, Gilbert, AZ (US)

( * ) Notice: Subject to any disclaimer, the term of this patent is extended or adjusted under 35 U.S.C. 154(b) by 0 days.

(21) Appl. No.: 14/256,266

(22) Filed: Apr. 18, 2014

(51) Int. Cl.  
*H02G 3/04* (2006.01)  
*H02G 1/06* (2006.01)

(52) U.S. Cl.  
CPC .............. *H02G 3/0418* (2013.01); *H02G 1/06* (2013.01)

(58) Field of Classification Search  
CPC .............................. H02G 3/0418; H02G 1/06  
USPC .................................................. 174/72 A, 95  
See application file for complete search history.

(56) References Cited

U.S. PATENT DOCUMENTS

| | | | | |
|---|---|---|---|---|
| 4,077,434 | A | * | 3/1978 | Sieckert et al. .................. 138/92 |
| 4,398,564 | A | * | 8/1983 | Young et al. ..................... 138/92 |
| 5,336,849 | A | * | 8/1994 | Whitney ..................... 174/72 C |
| D498,211 | S | | 11/2004 | Thibault |
| D503,968 | S | | 4/2005 | Ruddick |
| D503,969 | S | | 4/2005 | Ruddick |
| D504,938 | S | | 5/2005 | Ruddick |
| D539,752 | S | | 4/2007 | Ruddick |
| D541,143 | S | | 4/2007 | Ruddick |
| 7,696,434 | B2 | | 4/2010 | Ruddick |
| D669,035 | S | | 10/2012 | Ruddick |
| D671,502 | S | | 11/2012 | Ruddick |
| D683,318 | S | | 5/2013 | Ruddick |

* cited by examiner

*Primary Examiner* — Dhirubhai R Patel  
(74) *Attorney, Agent, or Firm* — Ryan Liebengood

(57) ABSTRACT

A cable rail assembly including a first cable rail having a base, a cover, and a closing member, a second cable rail having a base, a cover, and a closing member, and wherein the first and second cable rails are engageable with each other along a longitudinal axis of the first and second cable rails.

4 Claims, 11 Drawing Sheets

CABLE RAIL SYSTEM

BACKGROUND

1. Technical Field

Aspects of the present disclosure relate generally to cable rails and more specifically to cable rails which hide line voltage cables and low voltage cable for an aesthetically pleasing appearance.

2. Background Art

Electrical cords and plugs are well known and are used to provide electrical current to a number of devices. Modern televisions are light enough to be hung on the wall, yet still need to be connected to an electrical outlet. In new construction, an electrical outlet can be located where a television will ultimately be mounted, yet the majority of households have electrical outlets near the floor. In these instances, the television electrical cable droops from the mounted television to reach the electrical outlet near the floor and creates an unsightly appearance. Further, DVD players, cable boxes, and similar devices which play through the television must be connected to the television with an HDMI cable or other suitable cable. These cables then must be run up the wall and further clutters the television's appearance.

SUMMARY

Aspects of this disclosure relate to a cable rail assembly. In one aspect, a cable rail assembly includes a first cable rail having a base, a cover, and a closing member, a second cable rail having a base, a cover, and a closing member, and wherein the first and second cable rails are engageable with each other along a longitudinal axis of the first and second cable rails.

In an implementation, the first and second cable rails are releasably engageable with each other. The first and second cable rails may include closing members which are biased in the open position. The first and second cable rails may each include a hinge member. The first and second cable rails may each include a side wall separating the base and cover. The cover may include a curved portion. The first rail may include a mating portion. The second rail may include a mating portion. The first and second rails may each include a mating portion. Each of the mating portions may be formed in a sidewall. The first and second rail mating portions may be positioned on the longitudinal axis. The first rail mating portion may be a recessed mating portion. The second rail mating portion may be a protruding mating portion. The first rail may include a protruding mating portion and the second rail may include a recessed mating portion.

In an implementation, a third cable rail may be positionable between and engageable with the first and second cable rails. The third cable rail may be generally square or rectangular. The third cable rail may include at least one mating portion. The at least one mating portion may be two mating portions, with one mating portion being a protruding mating portion and the other mating portion being a recessed mating portion. The third rail protruding mating portion may be oriented about a longitudinal axis of the third rail.

In another aspect, a method of hiding cables includes engaging a first cable rail and a second cable rail along a longitudinal axis at a mating portion of each of the first rail and the second rail, opening the first cable rail at a closing member, mounting the first and second cable rails to a wall, positioning at least one cable within an opening in the first cable rail, and closing the closing member.

In an implementation, the method may include opening the second cable rail at a closing member, positioning at least one cable within an opening in the second cable rail, and closing the second cable rail closing member.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and.

DETAILED DESCRIPTION

This disclosure, its aspects and implementations, are not limited to the specific components or assembly procedures disclosed herein. Many additional components and assembly procedures known in the art consistent with the intended operation and assembly procedures for a cable rail system will become apparent for use with implementations of a cable rail system from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of a cable rail system.

Figure 1:
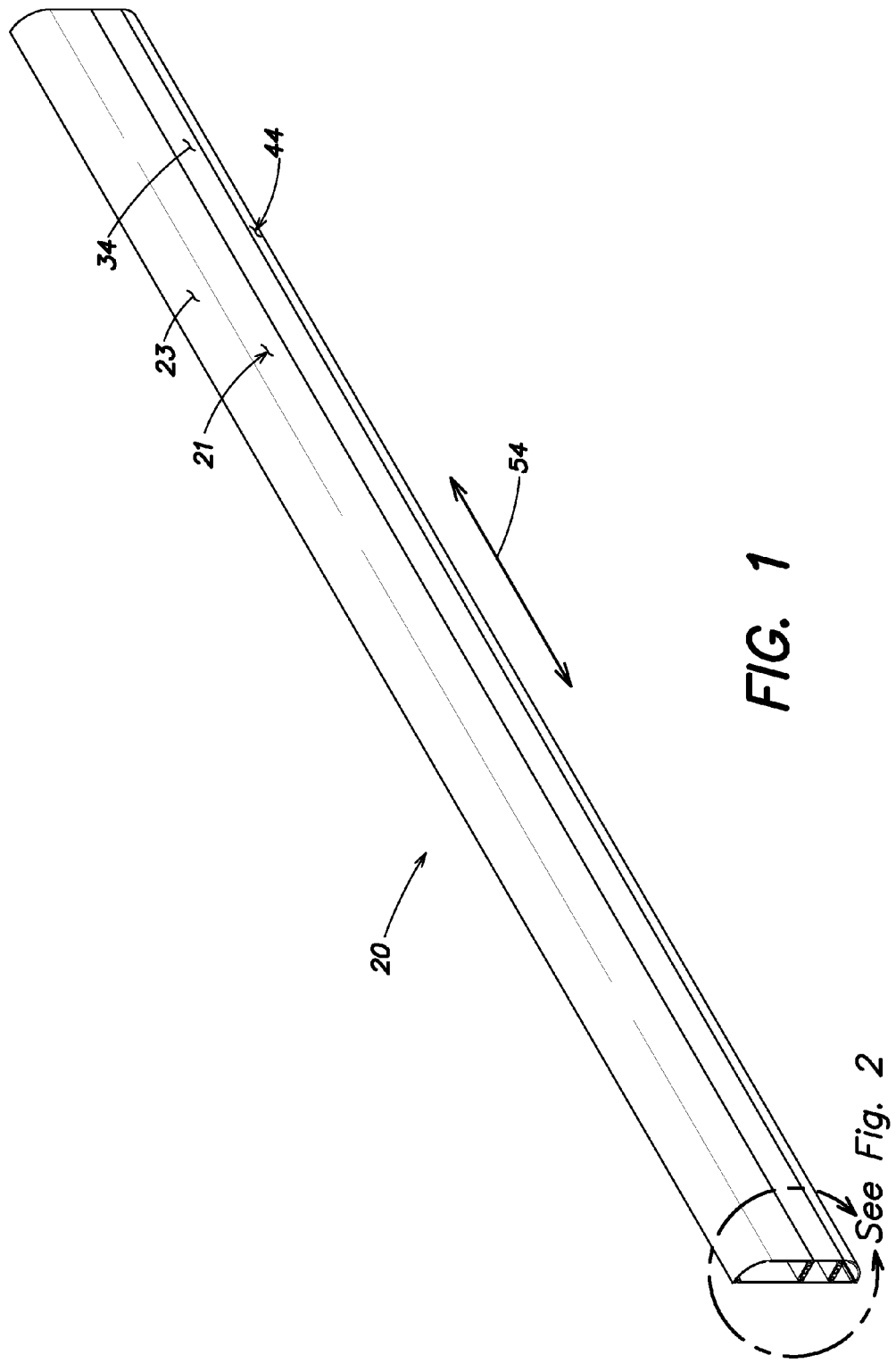
FIG. 1 is a perspective view of a first aspect cable rail assembly.
Figure 2:
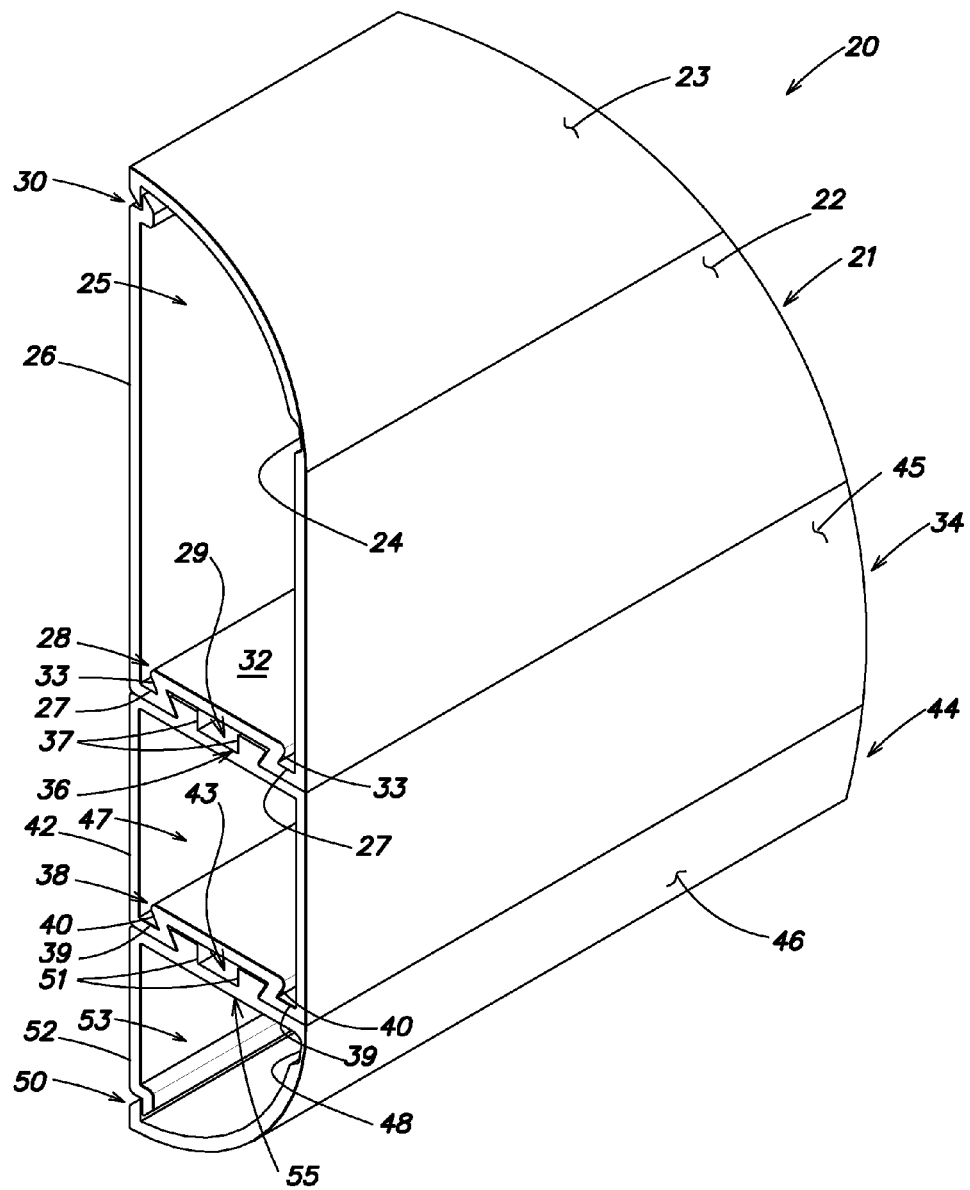
FIG. 2 is an enlarged perspective view of the region labeled FIG. 2 in FIG. 1.
Figure 3:
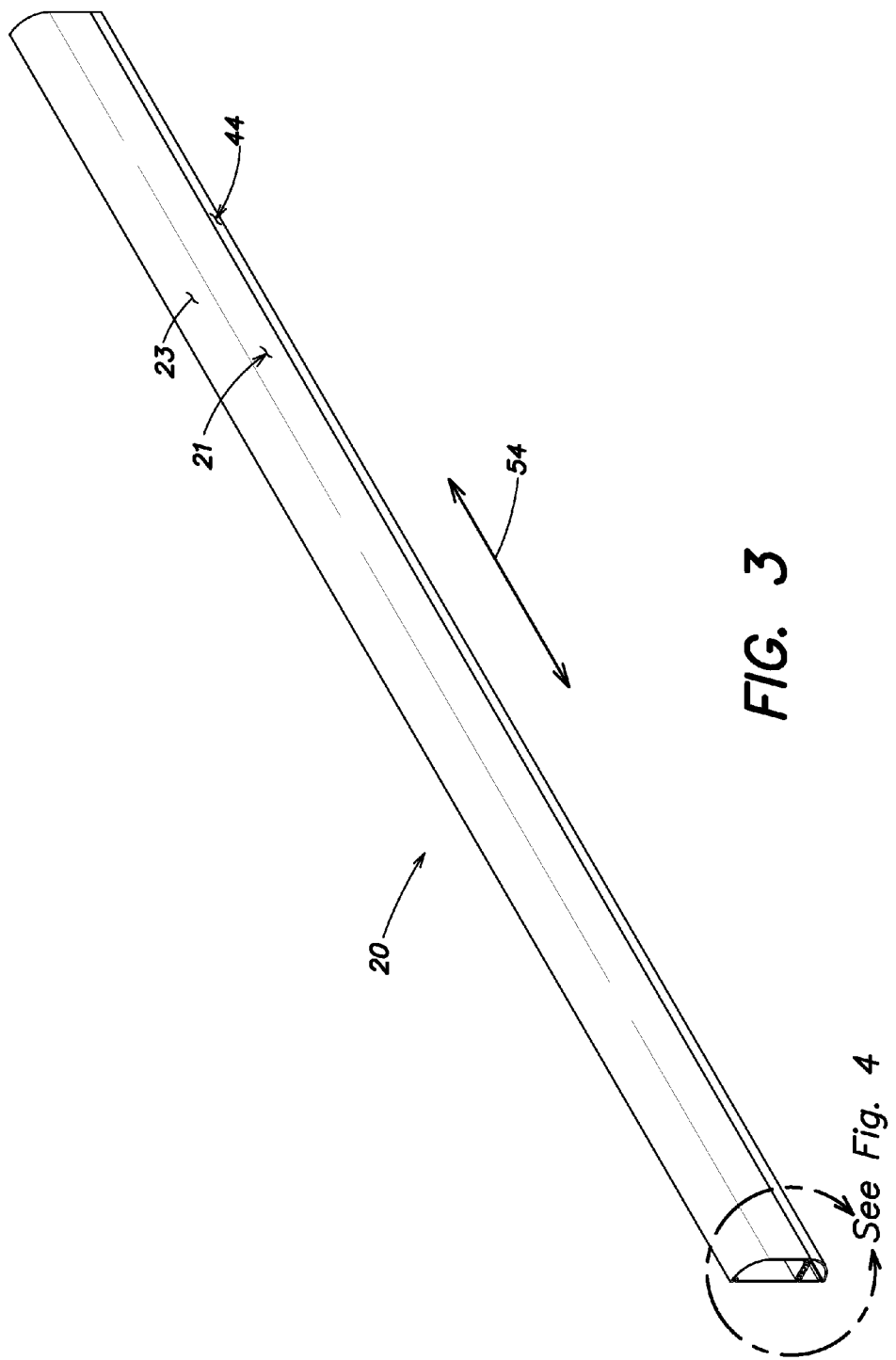
FIG. 3 is a perspective view of a second aspect cable rail assembly.
Figure 4:
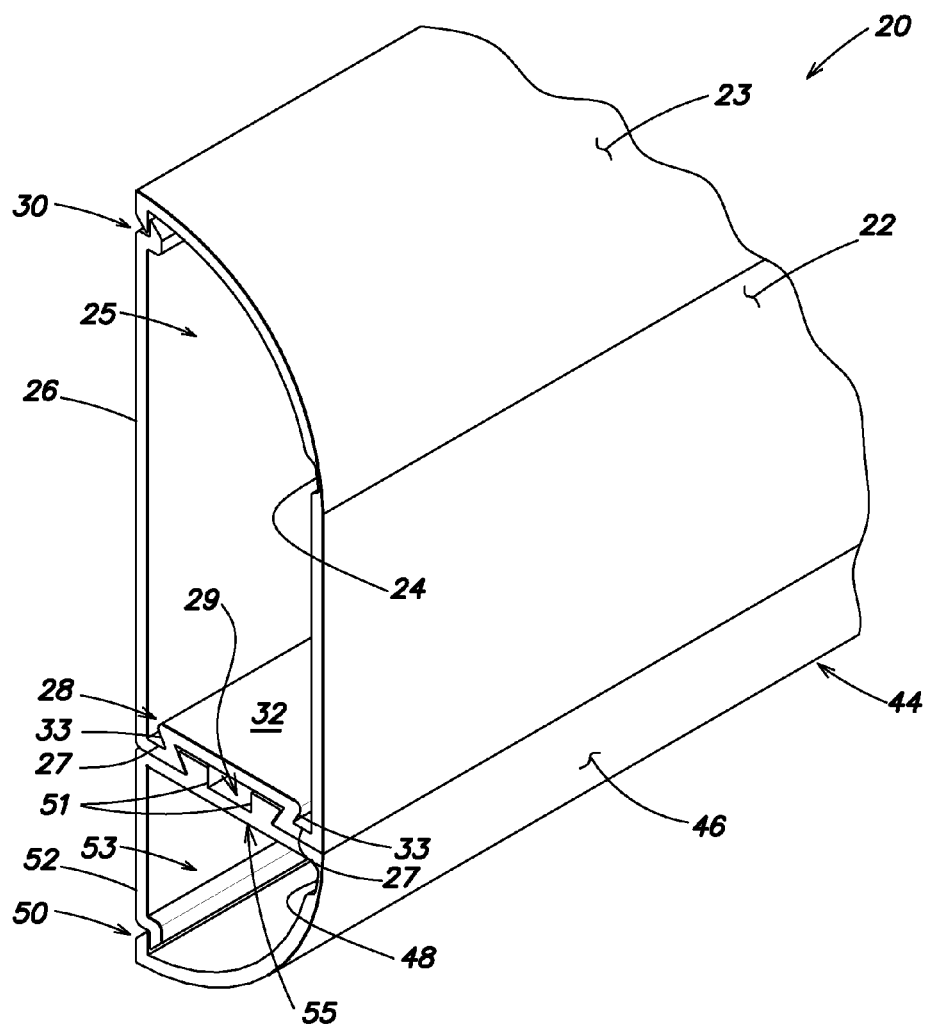
FIG. 4 is an enlarged perspective view of the region labeled FIG. 4 in FIG. 3.
Figure 5:
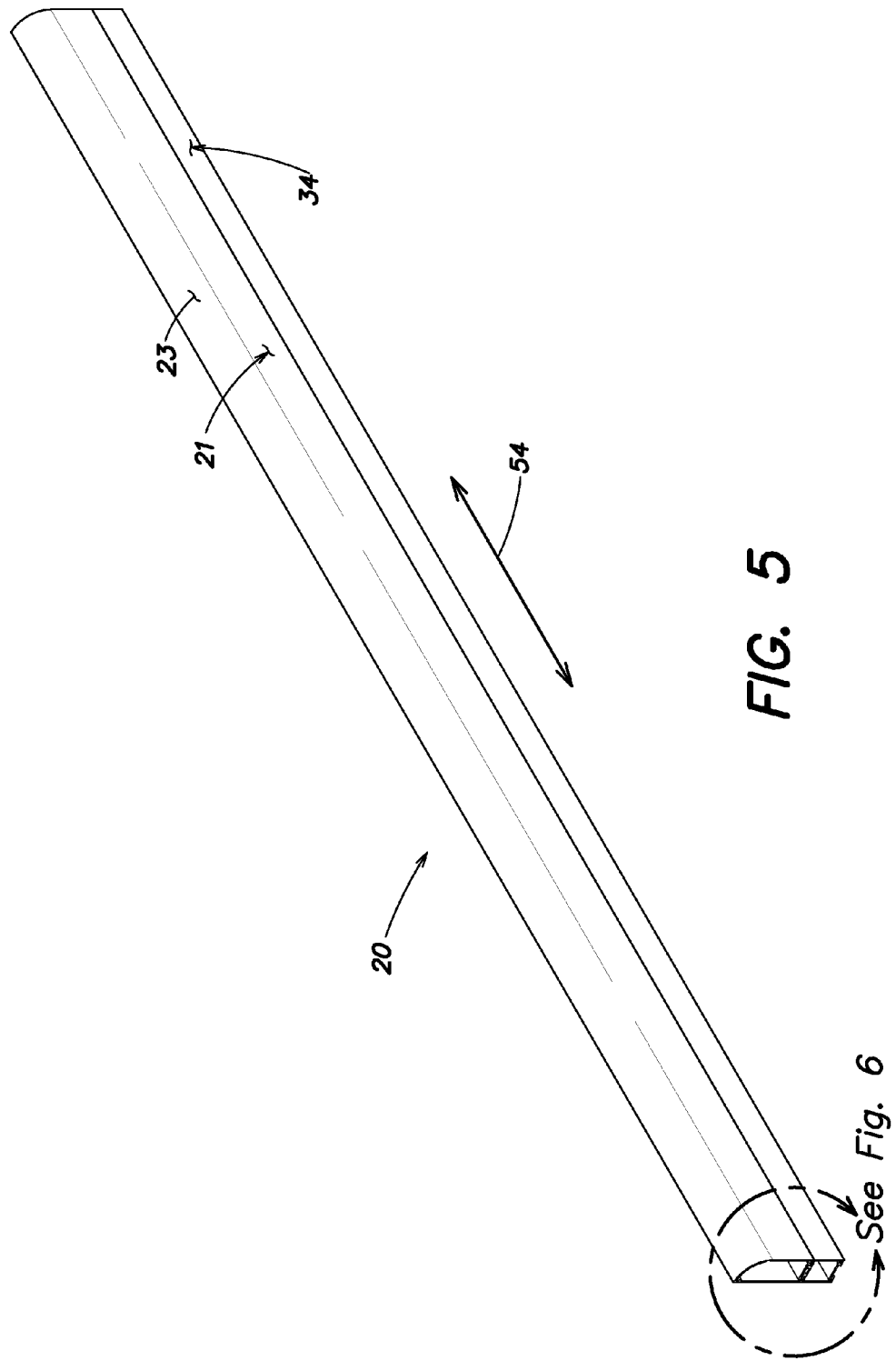
FIG. 5 is a perspective view of a third aspect cable rail assembly.
Figure 6:
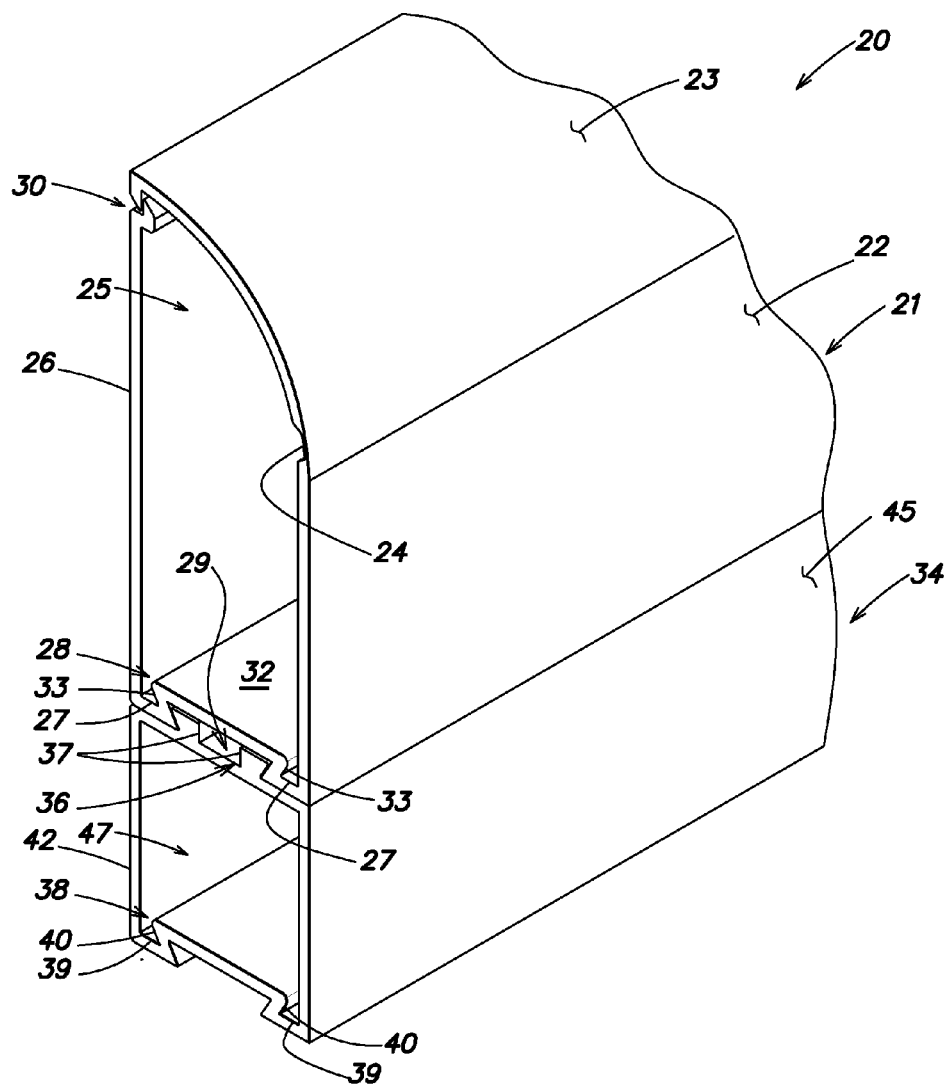
FIG. 6 is an enlarged perspective view of the region labeled FIG. 6 in FIG. 5.
Figure 7:
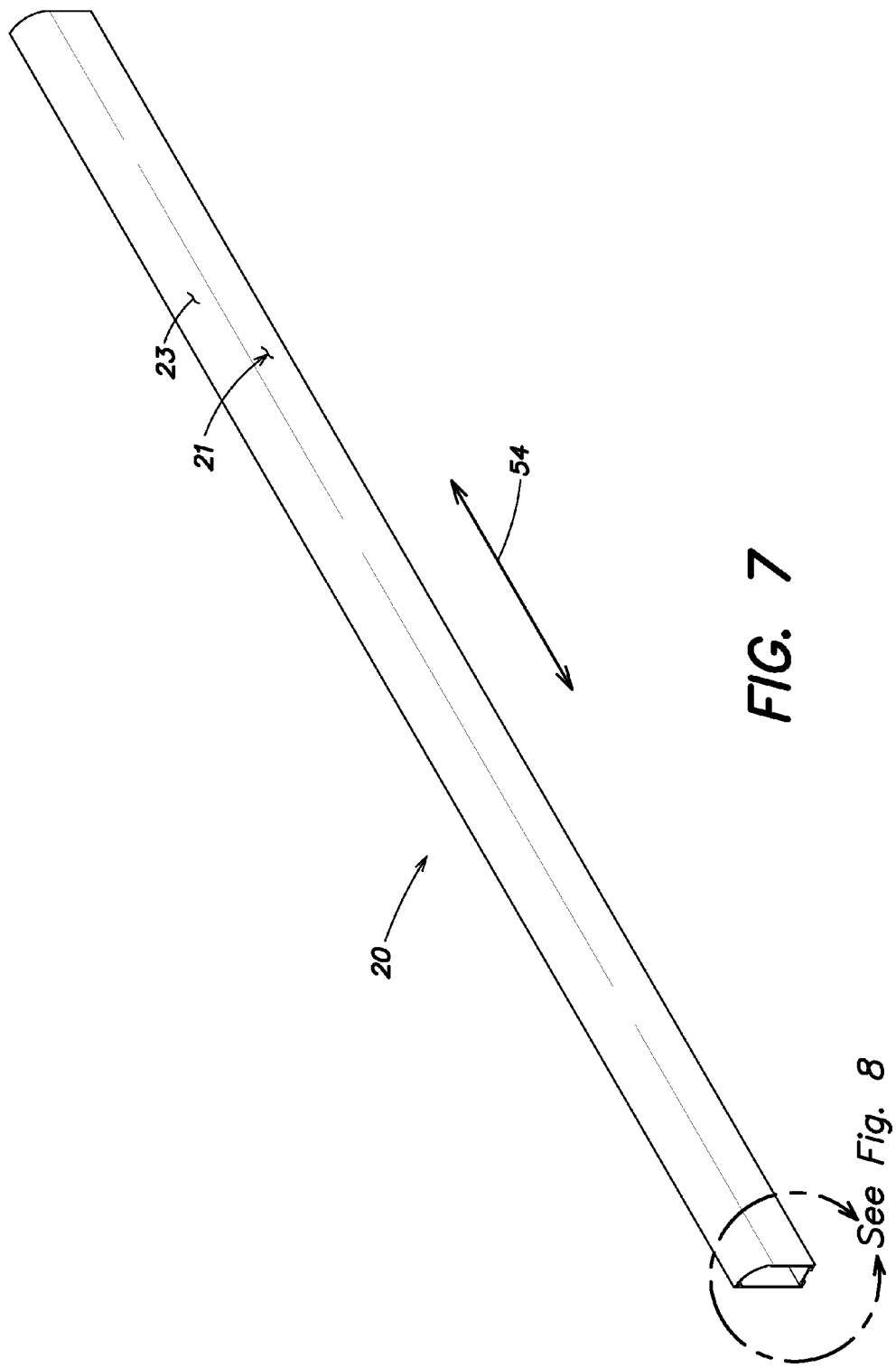
FIG. 7 is a perspective view of a fourth aspect cable rail assembly.
Figure 8:
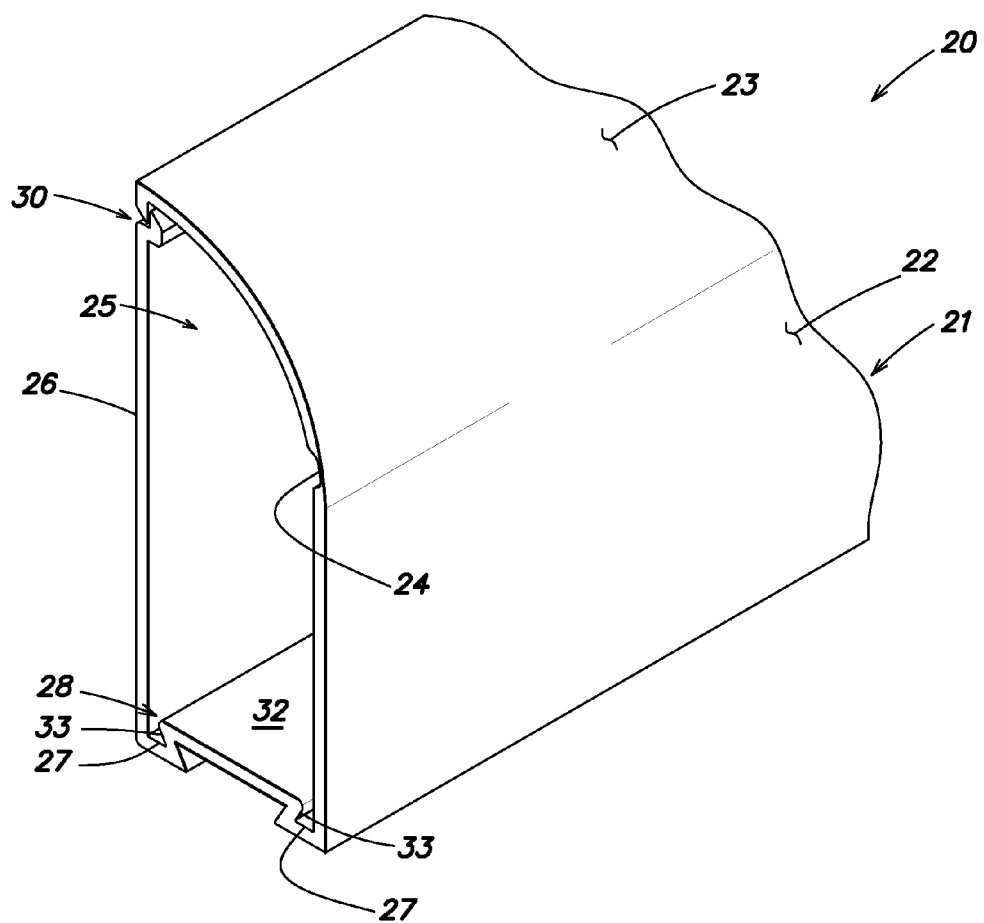
FIG. 8 is an enlarged perspective view of the region labeled FIG. 8 in FIG. 7.
Figure 9:
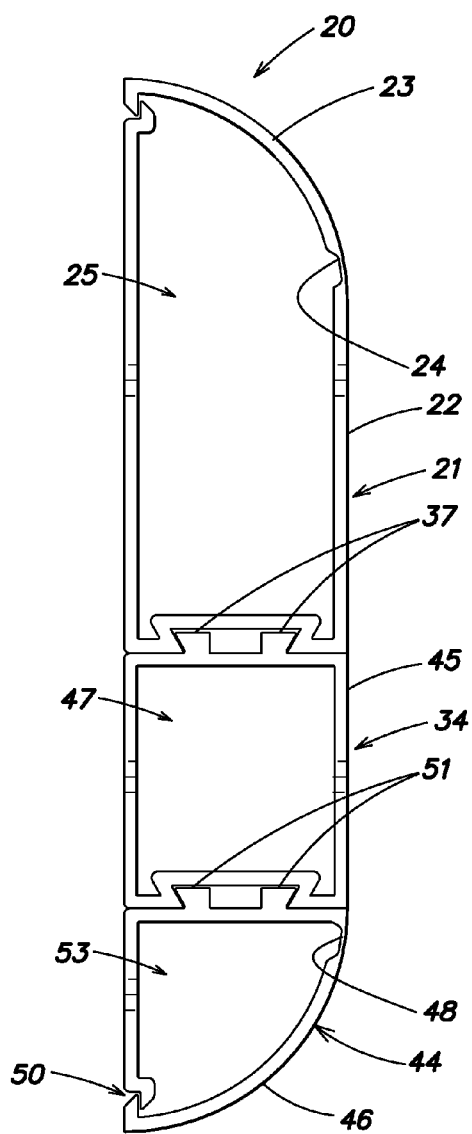
FIG. 9 is an endwise view of the first aspect cable rail assembly of FIG. 1.
Figure 10:
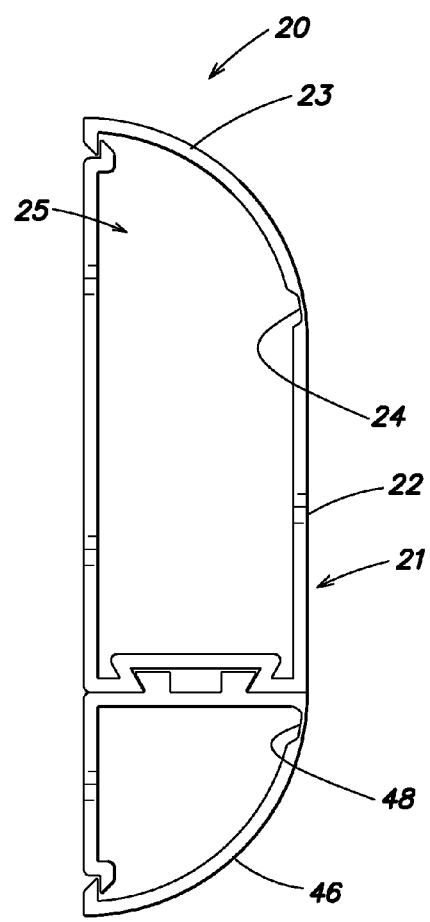
FIG. 10 is an endwise view of the second aspect cable rail assembly of FIG. 3.
Figure 11:
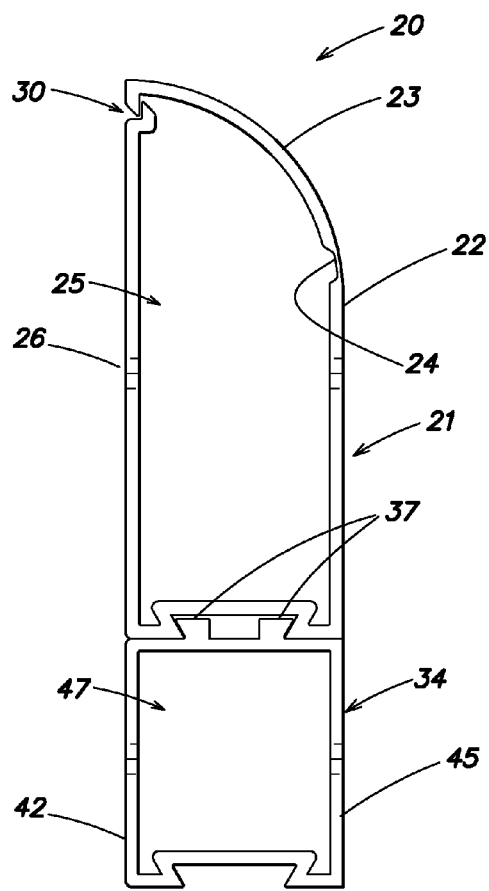
FIG. 11 is an endwise view of the third aspect cable rail assembly of FIG. 5.
Figure 12:
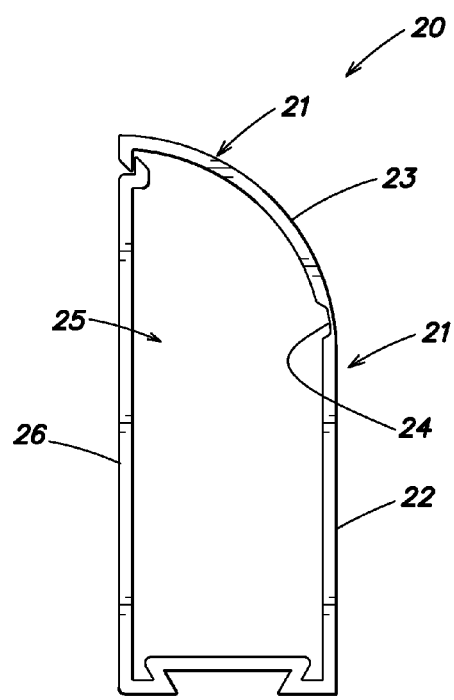
FIG. 12 is an endwise view of the fourth aspect cable rail assembly of FIG. 7.
Figure 13:
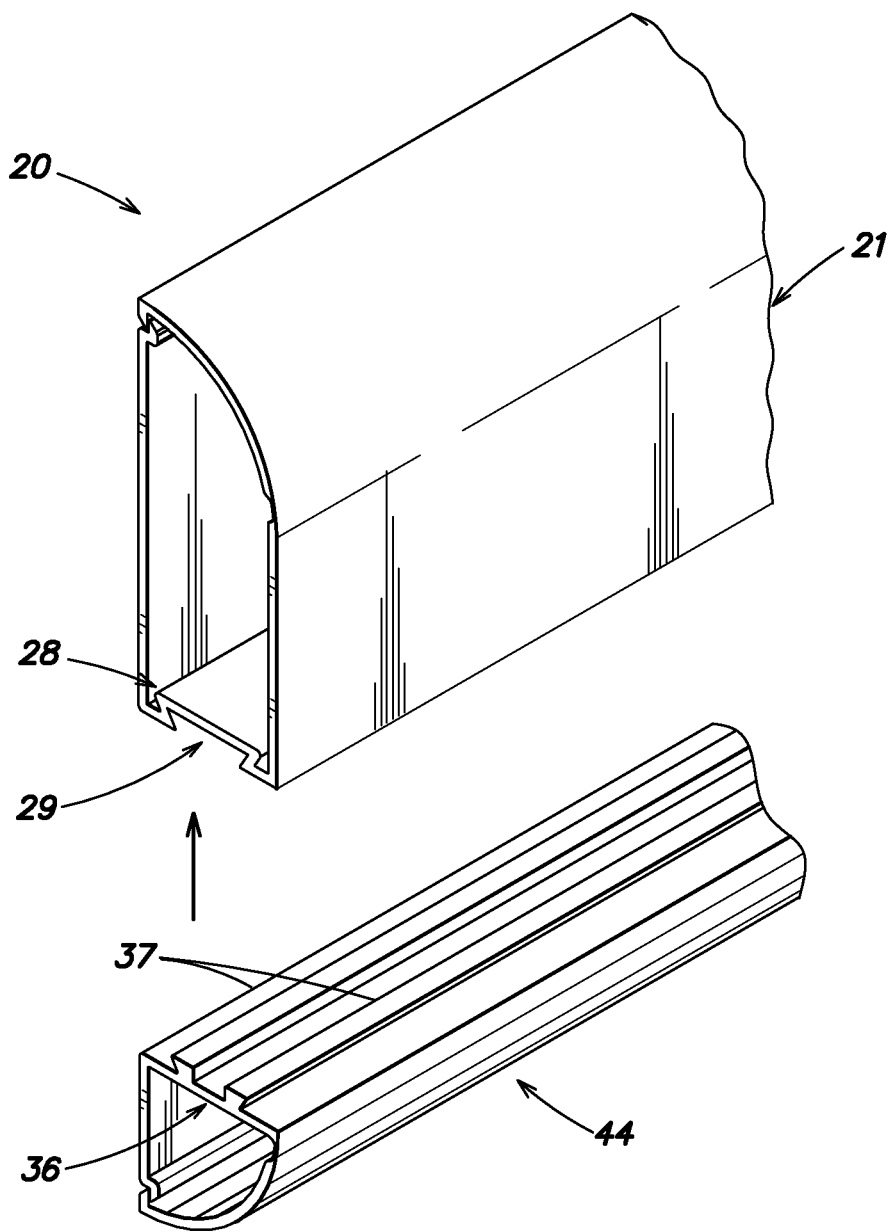
FIG. 13 is an exploded enlarged perspective view of the second aspect cable rail assembly.

FIGS. 1 through 13 illustrate various views of the cable rail assembly 20 of the present disclosure. FIGS. 1, 2, and 9 illustrate views of the fully assembled large chair rail application which is generally 4.125" tall. FIGS. 3, 4, and 10 illustrate views of the fully assembled small chair rail application which is generally 3.125" tall. FIGS. 5, 6, and 11 illustrate views of the fully assembled large baseboard rail application which is generally 3.25" tall. FIGS. 7, 8, and 12 illustrate views of the fully assembled small baseboard rail application which is generally 2.25" tall. FIG. 13 illustrates an exploded view of the small chair rail application to better illustrate the connectivity between the various components of the system.

Referring to FIGS. 1, 2, and 9, the large chair rail application is the largest of the cable rail assembly 20. Cable rail assembly 20 may include a baseboard rail 21 having a cover portion 22, a curved cover portion 23 with a hinge 24. Hinge 24 may at least partially connect the cover portion and the curved cover portion while providing flexibility to open the curved cover portion 22 and permit access to a cavity 25 for securing wires (not shown) along the length of the cable rail assembly 20. The baseboard rail 21 may also include a base portion 26, a sidewall portion 28 having walls 27 and 33 forming a recessed mating portion 29 in the sidewall portion 28. Still further, sidewall portion 28 includes a sidewall 32 having a stepped surface. Baseboard rail 21 may further include a closing member 30 formed distal to sidewall portion 28. In this manner, closing member 30 maybe biased to the closed position so that the wires within cavity 25 remain fully enclosed but the closing mechanism can easily be overcome to provide access to the cavity 25 in combination with the hinge 24.

An extension rail 34 may include a top wall having a protruding mating portion 36 having a pair of locking rails 37 shaped and oriented in a manner to be received within recessed mating portion 29 of baseboard rail 21. Extension rail 34 may also include a sidewall portion 38 having walls 39 and 40 forming a recessed mating portion 43. A base portion 42 may be positioned opposite cover portion 45. As can be seen, extension rail 34 is shown without a hinge, closing member or other suitable mechanism to access a cavity 47. Nevertheless, a person of skill in the art will immediately appreciate that a closing member and hinge may be incorporated without departing from the spirit and scope of the present disclosure. For example, a slit may be positioned between locking rails 37 to provide access therein.

A quarter round rail 44 is also shown having a cover portion 46 which is generally rounded and a hinge portion 48 connecting the portion 46 and a top portion 55. A base portion 52 is positioned with a closing member 50 to provide access to cavity 53 for wiring (not shown) to extend the length of the quarter round rail 44. Similar to extension rail 34, top portion 55 includes a protruding mating portion rails 51 arranged to be received within the recessed mating portion of the baseboard rail or extension rail.

As seen in FIG. 1, the rails, individually and collectively have a length along a transverse axis 54 to the cross-sectional area. In some applications, the rail assembly is sold in 8 foot sections and can be cut by the installer or purchaser to the desired length. A number of adapters may be utilized and compatible with the chair rail to provide entry for the cable from the top or bottom or to extend the overall length of the assembly.

Moving now to FIG. 13, baseboard rail 21 and quarter round rail 44 are shown in greater detail. Accordingly it seen that the protruding mating portion of quarter round rail 44 (or the extension rail) may include two or more trapezoidal or other shaped locking rails running along the transverse axis length 54. In this orientation, the locking rails are complimentary shaped to the recessed mating portion 29 of baseboard rail 21 (or extension rail as the case may be) so that the mating portions may be slide lengthwise together and connected together. After this connection, the pieces may be separated by relative movement in the direction associated with axis 54 and create a single, larger volume wiring storage device. While the shape and number of locking rails can be helpful, a number of suitable sizes, shapes, and orientations may be utilized to connect multiple rails into a single rail that can be mounted on a wall or other suitable structure as a single piece.

FIGS. 3, 4, and 10 illustrate the combination of baseboard rail 21 with quarter round rail 44. In this orientation, a smaller chair rail assembly is accomplished utilizing the same locking features and connection methodology disclosed above. Accordingly, the installer may select the two necessary components from the chair rail assembly parts, slide the baseboard rail 21 and the quarter round rail 44 together along the transverse axis, open the closing members to round cables and mount the combined rail assembly to a wall in a short period of time.

FIGS. 5, 6, and 11 illustrate the combination of baseboard rail 21 with extension rail 34 to form a larger baseboard rail assembly. In this orientation, the assembly is accomplished utilizing the same locking features and connection methodology disclosed above but the quarter round rail 44 is merely omitted.

FIGS. 7, 8, and 12 illustrate the baseboard rail 21 alone as may be utilized in applications where only a shorter baseboard rail is desired. In this manner, the installer may simply open the closing member, mount the baseboard rail to a wall through known means (screws, nails, double sided tape, etc.), route cables through the cavity, and close the closing member. Alternatively, the installer may route wires through the cavity (as is applicable to all embodiments disclosed herein) before securing the rail assembly to a wall or floor.

Alternatively, double sided tape, or a single sided tape may be utilized between the locking rails and on each side of the locking rails to provide a smooth and flat surface for mounting the baseboard rail or extension rail to a hard surface, such as the floor or a wall. Still further, the same methodology may be used to locate double sided tape adjacent to the locking rails on the quarter round rail and to assist with securing the quarter round to a wall or floor as may be appropriate.

Accordingly, it is seen that a single kit of components may provide a larger number of applications which when combined together properly form a single structure that can be mounted to a wall or floor to secure wiring in a cavity with the appearance of a large or small baseboard, a large or small chair rail, or a quarter round rail.

It will be understood that implementations are not limited to the specific components disclosed herein, as virtually any components consistent with the intended operation of a method and/or system implementation for a cable rail system may be utilized. Components may comprise any shape, size, style, type, model, version, class, grade, measurement, concentration, material, weight, quantity, and/or the like consistent with the intended operation of a method and/or system implementation for a cable rail system.

The concepts disclosed herein are not limited to the specific implementations shown herein. For example, it is specifically contemplated that the components included in a particular implementation of a cable rail system may be formed of any of many different types of materials or combinations that can readily be formed into shaped objects and that are consistent with the intended operation of a cable rail system. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the cable rail system may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a cable rail system, it should be readily apparent that a number of modifications may be made without departing from the spirit thereof and that these implementations may be applied to other cable rail systems. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. A cable rail assembly comprising:
    a first rail assembly having a base portion, a sidewall portion, a cover portion, and a curved cover portion together defining a cavity;
    the curved cover portion having a hinge and a closing member with the curved cover portion engaging the base portion at the closing member to enclose the cavity;
    a second rail assembly having a base portion, a top portion, and a curved cover portion together defining a cavity;
    the second rail assembly curved cover portion having a hinge and a closing member with the second rail assembly curved cover portion engaging the second rail assembly base portion at the second rail assembly closing member to enclose the second rail assembly cavity;
    the first rail assembly having a longitudinal length with a first mating portion extending along the entire first rail assembly longitudinal length and the first mating portion being recessed in the sidewall portion;
    the second rail assembly having a longitudinal length with a second mating portion extending along the entire second rail assembly length and the second mating portion having a protrusion protruding from the top portion; and,
    wherein the first and second cable rails are slidably engaged with each other along their respective longitudinal lengths upon engagement with the first and second mating portions.

2. The cable rail assembly of claim 1 wherein the first rail assembly base portion, the first rail assembly sidewall portion, the first rail assembly cover portion, and the first rail assembly curved cover portion are molded as a single piece.

3. The cable rail assembly of claim 1 further comprising an extension rail positioned between the first rail assembly and the second rail assembly.

4. The cable rail assembly of claim 1 wherein the first and second rail assemblies are releasably engaged with each other.

* * * * *